(12) United States Patent
Fidziukiewicz

(10) Patent No.: US 6,904,680 B2
(45) Date of Patent: Jun. 14, 2005

(54) METHOD OF MAKING A GUIDE BUSHING

(75) Inventor: Erich D. Fidziukiewicz, South Lyon, MI (US)

(73) Assignee: Anchor Lamina, Inc., Windsor (CA)

( * ) Notice: Subject to any disclaimer, the term of this patent is extended or adjusted under 35 U.S.C. 154(b) by 0 days.

(21) Appl. No.: 10/873,007

(22) Filed: Jun. 21, 2004

(65) Prior Publication Data

US 2004/0223674 A1 Nov. 11, 2004

Related U.S. Application Data

(62) Division of application No. 10/172,453, filed on Jun. 14, 2002, now Pat. No. 6,799,894.

(51) Int. Cl.[7] .......................... B21D 53/10; F16C 17/02
(52) U.S. Cl. ............................ 29/898.059; 29/898.054; 29/898.056; 29/898.058; 29/898.07
(58) Field of Search .................... 29/898.054, 898.055, 29/898.056, 898.057, 898.058, 898.059, 898.07; 384/295–296, 275

(56) References Cited

U.S. PATENT DOCUMENTS

| | | | |
|---|---|---|---|
| 1,469,793 A | * | 10/1923 | Johnson et al. .......... 29/898.07 |
| 1,650,941 A | * | 11/1927 | Hopkins .................. 29/896.91 |
| 1,887,168 A | * | 11/1932 | Rauberstrauch ........ 29/898.059 |
| 2,644,350 A | | 7/1953 | Regimbald |
| 2,666,677 A | * | 1/1954 | Miller .......................... 384/296 |
| 2,734,785 A | * | 2/1956 | Toulmin, Jr. ................. 384/125 |
| 3,193,335 A | | 7/1965 | Wing |
| 3,639,960 A | * | 2/1972 | Waage .................... 29/898.059 |
| 3,668,040 A | * | 6/1972 | Clark .......................... 156/294 |
| 3,680,429 A | | 8/1972 | Briles |
| 3,945,695 A | | 3/1976 | Speakman |
| 4,740,117 A | | 4/1988 | Schaff Deleury et al. |
| 4,922,573 A | | 5/1990 | Miller et al. |
| 5,685,057 A | | 11/1997 | Tsui |
| 5,829,317 A | | 11/1998 | Vreeken et al. |
| 5,947,496 A | | 9/1999 | Kraft et al. |
| 6,122,995 A | | 9/2000 | Gievers et al. |
| 6,272,751 B1 | * | 8/2001 | McMeekin ............. 29/898.054 |

OTHER PUBLICATIONS

"General Engineering Manual" by Orkot Ltd., South Yorkshire, England (1995).

* cited by examiner

*Primary Examiner*—Eric Compton
(74) *Attorney, Agent, or Firm*—Brooks Kushman P.C.

(57) ABSTRACT

A bushing utilizes a fabric reinforced thermoset composite sleeve incorporated within an outer shell in a construction enabling the sleeve to be press-fitted within the shell and held therein by a constriction in the shell bore which is embraced by the bearing liner. Following installation of the bearing sleeve, the sleeve bore may be reamed to provide a uniform inside diameter.

4 Claims, 1 Drawing Sheet

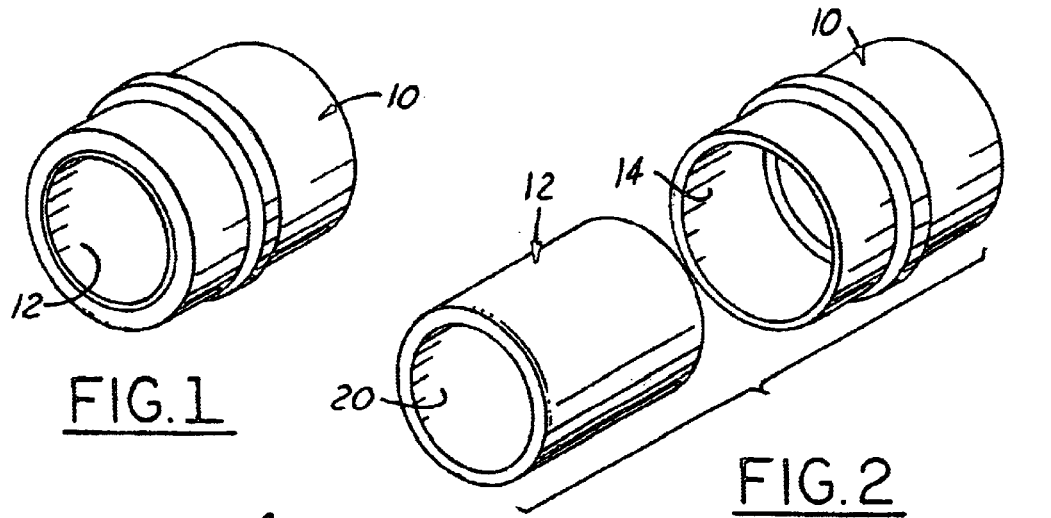
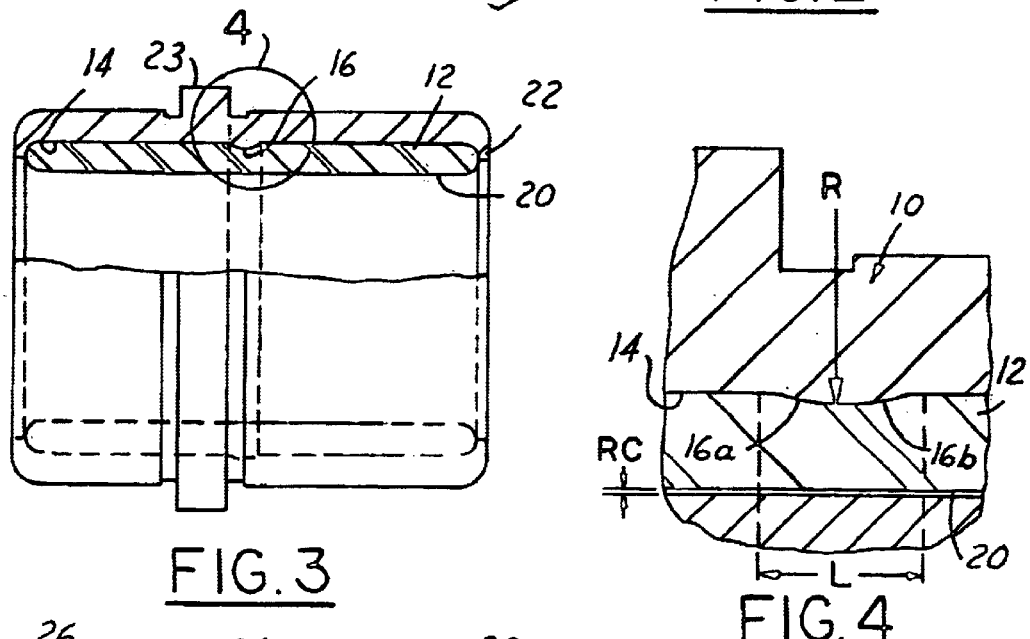
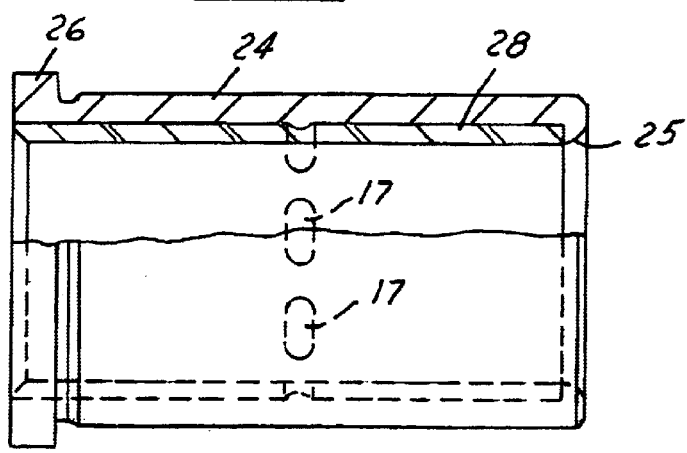

METHOD OF MAKING A GUIDE BUSHING

CROSS-REFERENCE TO RELATED APPLICATIONS

This application is a divisional of U.S. application Ser. No. 10/172,453 filed Jun. 14, 2002, now U.S. Pat. No. 6,799,894.

BACKGROUND OF THE INVENTION

1. Field of the Invention

This invention relates to industrial and commercial bushings for use in a wide variety of applications.

There is a continuing need for a lightweight, low-cost, self-lubricating bushing for use in industrial and commercial applications. Bushings having a self-lubricating bearing sleeve made from a fabric reinforced thermoset composite could be of substantial use if there were a low-cost simple way of assembling such fabric reinforced thermoset composite within a bushing shell.

2. Background Art

U.S. patents showing bushings over which my disclosure represents an improvement are as follows:

U.S. Pat. No. 5,685,057
U.S. Pat. No. 3,945,695
U.S. Pat. No. 4,740,117

A publication entitled "General Engineering Manual" by Orkot Ltd. of Bradmarsh Business Park, Rotherham, S60 1 BX, South Yorkshire, England, also shows prior art information.

SUMMARY OF THE INVENTION

I have discovered that a fabric reinforced thermoset composite sleeve may be incorporated within an outer shell of a bushing in a construction which enables the sleeve to be press-fitted within the shell to be held therein by a constriction in the shell bore which is embraced by the bearing liner. As the inner bearing sleeve or liner is pressed axially into the shell, it encounters the constriction which is shaped to permit the sleeve to be squeezed past it. Because the sleeve is distorted at the constriction, the sleeve bore is reamed or otherwise sized after installation of the sleeve to provide a uniform internal diameter throughout the sleeve. The constriction of the shell is greater than the running clearance between the inside diameter of the sleeve and the outside diameter of the shaft or pin carried by the bushing, such that the sleeve cannot work its way out of the bushing once the shaft is in place during operation thereof.

BRIEF DESCRIPTION OF THE DRAWINGS

FIG. 1 is a perspective view of a bushing embodying my invention;

FIG. 2 is a perspective exploded view of a bearing sleeve to be press-fitted into the bearing shell;

FIG. 3 is a view partially in section through a bushing embodying the invention;

FIG. 4 is a fragmentary view taken at the circle 4 in FIG. 3; and

FIG. 5 is a view partially in section through a slightly different external configuration of the bushing.

DETAILED DESCRIPTION OF THE PREFERRED EMBODIMENT(S)

As shown in the drawings, the bushing comprises an outer shell, or bushing shell 10, and an inner bearing sleeve 12, both of generally cylindrical configuration. The bearing sleeve 12 is press-fitted within the shell 10.

The shell 10 has an inner cylindrical surface 14 of constant diameter except for the interruption by a radially, inwardly displaced wall portion or constriction 16, best shown in FIG. 4. While only one such constriction is shown, it is to be understood that multiple, axially spaced apart constrictions may be provided if desired. The constriction 16 preferably extends 360° around the cylindrical bore and its inward displacement exceeds the running clearance (RC) between the shaft 18 to be carried by the bearing and the internal surface 20 of the bearing sleeve. For example, the inward displacement of the shell wall at the constriction may be on the order of 0.008 inches, +0.00 inches and −0.002 inches. The RC will be somewhat less than this, for example, 0.0005 to 0.001 of an inch (per side).

When the bearing sleeve 12 is pressed into the shell 10, the sleeve encounters the constriction 16 but the pressure forcing the bearing sleeve axially into the shell should be sufficient to cause the sleeve to squeeze through the constriction and abut the flange 22 at the end of the shell bore. As will be apparent from FIG. 3, the constriction 16 is located substantially midway between opposite ends of the shell bore 14, though it may be placed at any other suitable or multiple locations.

The constriction 16 is preferably shaped to provide a smooth, hump-like continuous annular ring around the inside of the shell 10 such that the sleeve will be squeezed through the constriction. For this purpose, the constriction has smoothly shaped portions 16a and 16b at each side of the nest. For example, in a bushing for a one-inch shaft the hump may be formed on approximately a radius R (see FIG. 4) of 0.20 inches with an overall axial length L of 0.112 inches. Following the reaming the internal diameter of the sleeve is uniform as there has been a reduction in wall thickness of the sleeve at the point where the sleeve overlies the constriction.

The shell 10 may be formed of a pre-hardened steel or other metal and is relatively rigid as compared with the liner 12. The constriction 16 may be the result of an increased thickness wall section for the shell as shown in FIG. 4, or the shell may be inwardly upset at the location of the constriction to provide the reduced diameter portion.

The bearing sleeve 12 is preferably formed of a fabric reinforced thermoset composite. One such composite which has been found suitable is sold by Orkot Ltd. of Bradmarsh Business Park, Rotherham, S60 1 BX, South Yorkshire, England and specifically the product identified as Luytex C394. Also, a product sold under the mark "Lubricom" by Polygon Company of Walkerton, Ind. may be satisfactory. The Luytex product is an Aramid fiber with a high temperature resin system and incorporates polytetrafluoroethylene for lubrication purposes.

The liner 12 will give or flex slightly so that it will "wrap" around a shaft supported in the bushing such as the shaft 18 and thus increase the bearing surface area between the shaft and the sleeve avoiding a line contact which can adversely affect bearing life. This flexing of the liner also enables it to be pressed through the constriction 16 as above described.

In FIG. 5, I have shown a slight modification of the bushing in which the shell 24 is provided with an external flange 26 at one end as opposed to the flange 23 of the shell shown in FIG. 3. The constriction comprises a discontinuous ring of circumferentially spaced apart ring segments 17. Such ring segments, each being enveloped by the sleeve 28, will prevent any tendency of the sleeve to rotate relative to the shell where a rotating shaft is received within the bushing as distinguished from a reciprocating pin. I have found that for most applications the continuous ring constriction shown in FIG. 3 will prevent both axial rotational displacement between the sleeve and shell, but the discontinuous segments 17 shown in FIG. 5, on occasion may be useful.

By having the constriction 16 or 17 greater than the running clearance between the shaft or pin 18 and the sleeve 12 or 28, with the shaft or pin in place, as during normal operation of the bearing, the sleeve will not be able to move out of position as the thickness of the sleeve on opposite sides of the constriction will prevent such movement.

It will also be noted in FIG. 5 that the right hand end of the shell 24 has a bull-nose shape defined by a circumferential chamfer 25 which facilitates insertion of a pin or shaft (not shown) into the right hand end of the bushing.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. The method of making a guide bushing comprising:
   providing a relatively rigid shell having a cylindrical bore interrupted by a radially inwardly displaced wall portion forming a constriction in such bore;
   providing a resilient lubricating bearing sleeve sized to be press fitted into said cylindrical bore;
   pressing said sleeve axially into said cylindrical bore and beyond said constriction and causing the sleeve to embrace said constriction; and
   reaming the sleeve bore to provide a uniform internal diameter.

2. The method of claim 1 wherein the radially inwardly displaced wall portion is a continuous circumferential ring and the sleeve is pressed into the shell bore and squeezed over and beyond said ring.

3. The method of claim 1 wherein the radially inwardly displaced wall portion is a discontinuous ring of circumferentially spaced apart ring segments, and pressing the sleeve into the shell bore and squeezing the sleeve over and between the ring segments and there beyond.

4. The method of claim 1 wherein the radially inwardly displaced wall portion is located substantially midway between opposite ends of the shell bore.

* * * * *